United States Patent [19]

Kribs

[11] Patent Number: 5,112,094
[45] Date of Patent: May 12, 1992

[54] VEHICLE ARM REST

[76] Inventor: David E. Kribs, 368 Peninsular Ct., Haines City, Fla. 33844

[21] Appl. No.: 676,556

[22] Filed: Mar. 28, 1991

[51] Int. Cl.⁵ .............................................. B60R 7/00
[52] U.S. Cl. .................................................. 296/37.8
[58] Field of Search ................... 296/37.1, 37.8, 37.14, 296/37.15; 224/42.42

[56] References Cited

U.S. PATENT DOCUMENTS

| | | | |
|---|---|---|---|
| 4,423,812 | 1/1984 | Sato | 296/37.8 X |
| 4,453,759 | 6/1984 | Kathiria | 296/37.8 |
| 4,690,241 | 9/1987 | Miyadera | 296/37.14 X |
| 4,690,448 | 9/1987 | Fujisawa | 296/37.8 |
| 4,809,897 | 3/1989 | Wright, Jr. | 224/42.42 X |
| 4,818,008 | 4/1989 | Cressoni | 296/37.8 |
| 4,826,058 | 5/1989 | Nakayama | 296/37.15 X |
| 4,848,627 | 7/1989 | Maeda et al. | 224/42.42 X |
| 4,934,750 | 6/1990 | Eichler et al. | 296/37.8 |
| 4,940,275 | 7/1990 | Miki et al. | 296/37.8 |

FOREIGN PATENT DOCUMENTS 180339  10/1983  Japan ................................. 296/37.8

Primary Examiner—Johnny D. Cherry
Assistant Examiner—Joseph D. Pape

[57] ABSTRACT

An arm rest is disclosed that has a base that fits securely into a cavity in the molded, manufacturer-equipped console that is located between the driver and the front passenger seats of certain vehicles. The base piece of the arm rest extends up vertically from the cavity that is part of the molded console that is located between the driver and front passenger seat and has a groove at its top. A flat member, the arm rest piece, has a tongue on its underside and this tongue fits into the groove in the top of the base piece to form the complete arm rest. The upper side of the arm rest piece is finished to be comfortable to the human arm and to aesthetically match the interior of the vehicle.

1 Claim, 2 Drawing Sheets

VEHICLE ARM REST

BACKGROUND OF THE INVENTION

1. Field of the Invention

The present invention relates to an arm rest device that is mounted into the cavity that is part of the molded console that is located between the driver and the front passenger seats of certain vehicles.

2. Description of Prior Art

Numerous patents have been granted on arm rest constructions that are attached to vehicle doors and windows. Examples of these are U.S. Pat. No. 1,695,549 which was issued to J. Hausler on Dec. 18, 1928. This device fits over the lower molding of a vehicle window. Similarly, U.S. Pat. No. 1,756,694, which was issued to H. Loehr on Apr. 29, 1930 is also attachable to a vehicle door molding. U.S. Pat. No. 1,426,787 of Spencer and U.S. Pat. No. 3,603,637 of DePinto also show devices being adapted to be attached from the window well of an automobile. More recently, U.S. Pat. No. 4,730,867 was issued to Frank M. Cluba on Mar. 15, 1988 and U.S. Pat. No. 4,592,584 was issued to Pierce H. White on Jun. 3, 1986. Both of these devices also attach to automobile window wells.

None of the above-described inventions demonstrate an arm rest that is located between the driver seat and the front passenger seat of certain vehicles, which would thus be available to both driver and front seat passenger.

SUMMARY OF THE INVENTION

It is the object of the invention to provide an arm rest that fits securely into the cavity that is part of the console that is located between the driver and the front passenger seat of certain vehicles. This location makes the arm rest available to both the driver and the front seat passenger in the vehicle.

It is the object of this invention to preset at time of manufacture an arm rest at such a height and such a position from front to back of the front seat compartment of the vehicle to accommodate and be comfortable for most drivers and front seat passengers.

It is a further object of this invention to provide an arm rest available to both the driver and front seat passenger that can be adjusted from the back of the front seat compartment to the front of the vehicle and vice versa, if the set position at time of manufacture is not suitable to the driver and/or front seat passenger.

It is further an object of the invention to provide an arm rest available to both the driver and front seat passenger that can be fitted into the cavity in the front seat console and removed as desired.

It is further an object of this invention to provide an arm rest available to both the driver and front seat passenger that will fit securely into the cavity in the console of any vehicle that has such a console and cavity. Since different makes and models of vehicles have such consoles and cavities, but since cavities sizes and shapes differs in different vehicles, the object of this invention is to change the shape of the bottom of the base piece to fit any vehicle with a console and cavity that will accommodate it.

These, together with the objects of the invention, along with various features of novelty which characterize the invention, are pointed out with particularity in the claims annexed to and forming part of this disclosure. For a better understanding of the invention, its operating advantages and the specific objects obtained by its uses, references should be had to the accompanying drawings and descriptive matter in which there is illustrated preferred embodiments of the invention.

DESCRIPTION OF THE DRAWINGS

A detailed description of the preferred embodiment of the invention is hereinafter made to the drawings in which.

DESCRIPTION OF THE PREFERRED EMBODIMENT

Figure 1:
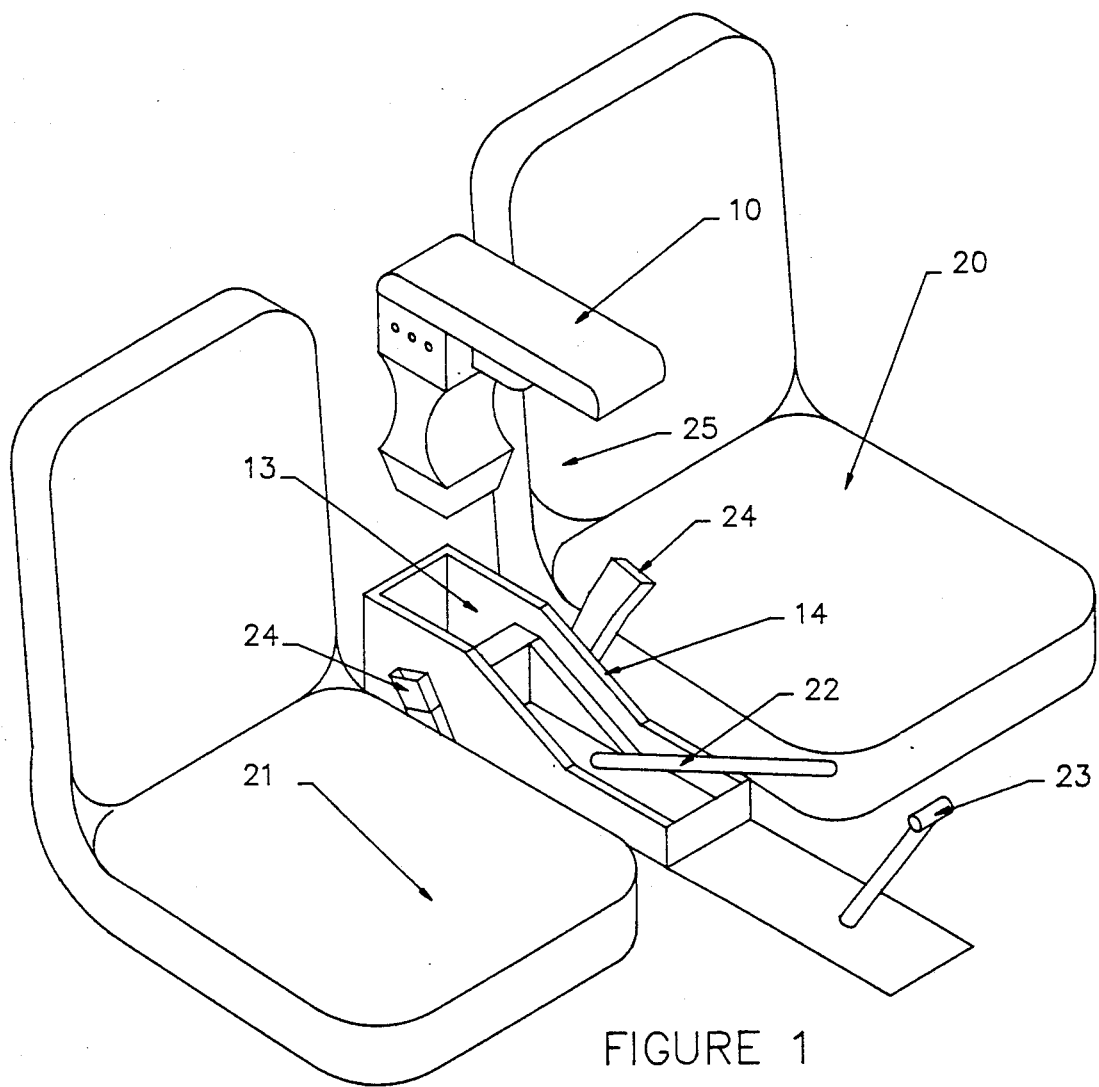
FIG. 1 is an exploded assembly view of the vehicle arm rest comprising the present invention.
Figure 4:
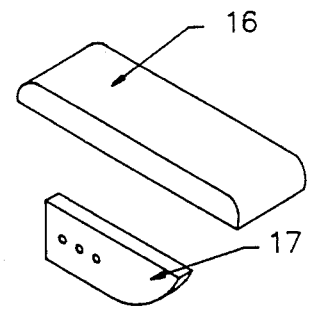
FIG. 4 is a pictorial view of the arm rest piece showing the tongue on the bottom that fits into the groove at the top of the base piece, with the holes that accommodate the fasteners that hold it in place, the top surface of the arm rest piece that is finished to be comfortable to the arm of the driver/front seat passenger and to blend aesthectily with the interior of the vehicle.
Figure 3:
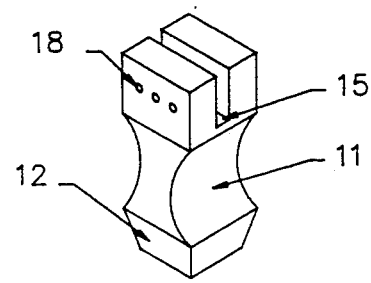
FIG. 3 is a side view of the base piece of the arm rest showing the configuration at its bottom which is shaped to fit snugly into the cavity in the console between the two front seats, and the groove at the top of the base piece into which the tongue on the bottom of the arm rest piece is fitted.
Figure 2:
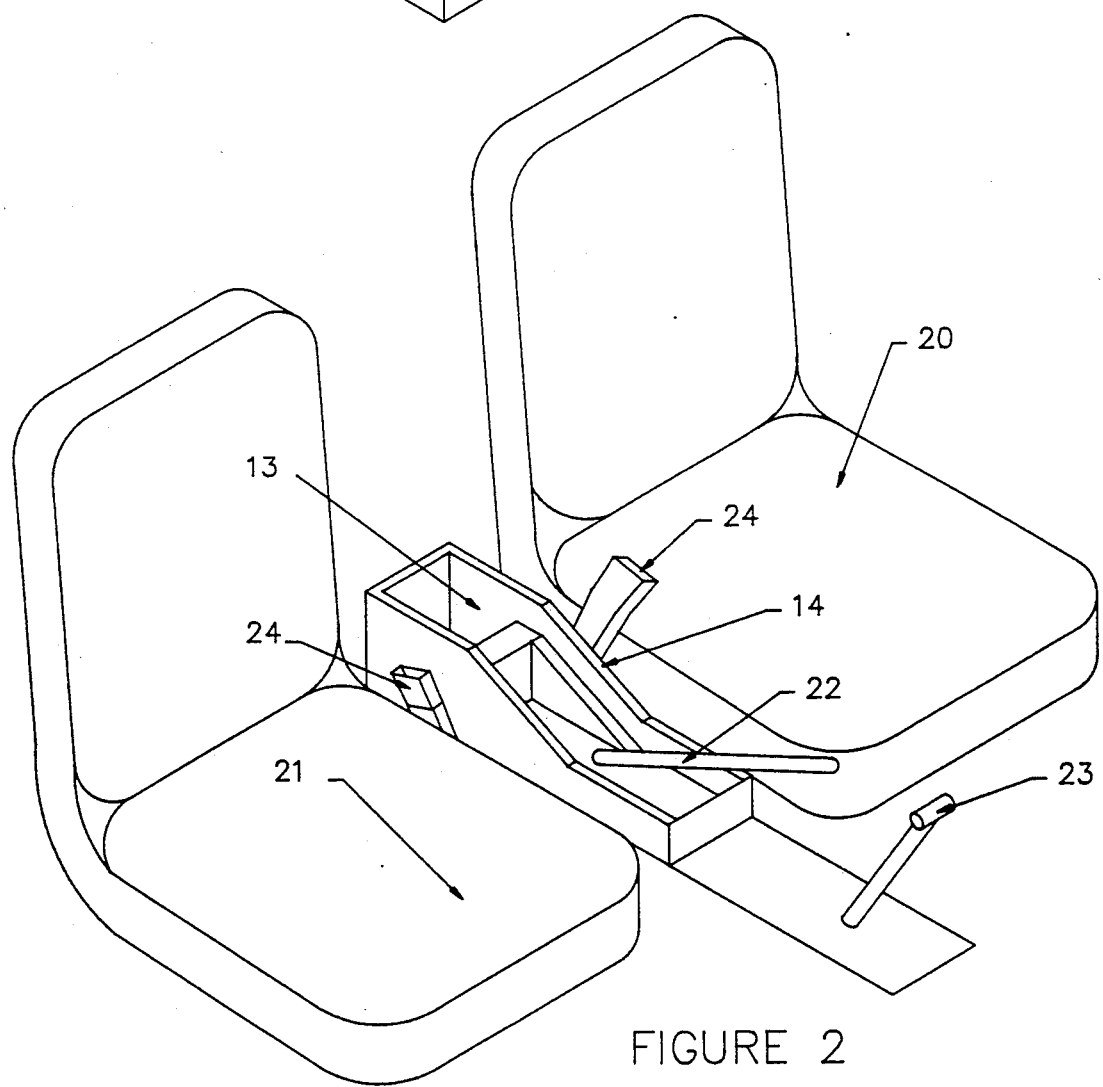
FIG. 2 is a perspective view of the front compartment of a vehicle showing the driver seat, the front passenger seat, the molded console between the two seats, the gear shift lever, the emergency brake handle, the seat belt latches, and particularly the cavity into which the base piece of the arm rest is inserted.

With reference now to the drawings, and in particular to FIG. 1, there is shown a vehicle arm rest 10 embodying the principles and concepts of the present invention. As shown in FIG. 1, the base piece 11 has its lower end 12 shaped to fit snugly into the cavity 13 that is part of the molded console 14 that is located between the driver seat 20 and the front passenger seat 21 of certain vehicles. At the top of the base piece there is a groove 15. Placed on top of the base piece 11 is the arm rest piece 16. The arm rest piece 16 has a tongue 17 on its underside that fits into the groove 15 on the upper end of the base piece 11. The tongue 17 on the bottom of the arm rest piece 16 is fastened securely into the groove 15 by extending fastener 18 thru apertures in the top side of the base piece 11 into the groove 15 and then into apertures in the tongue 17 on the underside of the arm rest piece 16. At the time of manufacture, the arm rest piece 16 is fastened to the top of the base piece 11 by fastener 18 at a height, and position from the front to the back of the vehicle, to be comfortable for most drivers/passengers. However, if the driver/passenger wishes to position the arm rest 16 piece differently from the front to the back of the vehicle, this can be done by removing the fastener 18, repositioning the arm rest piece 16, and reinserting the fastener 18. At time of manufacture, and at any subsequent repositioning, the base piece 11 extends high enough to position the arm rest piece 16 high enough to give the driver/front seat passenger unobstructed access to the emergency brake handle 22, the gear shift lever 23 and the seat belt latches 24. The top of the arm rest piece 16 is finished in such a manner to make it comfortable to the arm of the driver/front seat passenger and pleasing aesthetically with the interior of the vehicle, such as with foam rubber covered with upholstery material the same color as the vehicle's interior.

Referring now to construction material of the vehicle arm rest 10, the base piece 11, the arm rest piece 16, the tongue 17 on the under side of the arm rest piece 16 may be constructed of wood, molded plastic, or any other suitable material.

With respect to the above description then, it is to be realized that the optimum dimensional relationships for the parts of the invention, to include variations in size, materials, shape, form, assembly and use, are deemed readily apparent and obvious to one skilled in the art, and all equivalent relationships to those illustrated in the drawings and described in the specification are intended to be encompassed by the present invention. Therefore, the foregoing is considered illustrative only of the principles of the invention, and accordingly all suitable modifications and equivalents that may be resorted to fall within the scope of this invention.

What is claimed as being new and desired to be protected by Letters Patent of the United States is as follows:

1. An arm rest for a vehicle to be fitted snugly into a cavity that is part of a molded console that is located between a driver seat and a front passenger seat of certain vehicles, said arm rest comprising:
   a. a base piece, said base piece including a bottom end and an upper end, the bottom end of which fits snugly into the cavity that is part of the molded console, the upper end includes a groove;
   b. an arm rest piece, said arm rest piece including a tongue attached to an underside of the arm rest piece, said tongue fits into said groove;
   c. a longitudinal adjustment means, said adjustment means comprising a plurality of apertures in the upper end of the base piece, a plurality of apertures in the tongue, and a fastener insertable into said base piece and tongue apertures in order to fix the arm rest at a given longitudinal position relative to the driver and passenger seats, said adjustment means for selectively varying the longitudinal position of the arm rest piece tongue.

* * * * *